United States Patent
Dauwalter et al.

(10) Patent No.: US 7,356,922 B2
(45) Date of Patent: Apr. 15, 2008

(54) METHOD OF FABRICATING A RATE GYROSCOPE AND ACCELEROMETER MULTISENSOR

(75) Inventors: Charles R. Dauwalter, Newton Highlands, MA (US); Donato Cardarelli, Medfield, MA (US); Paul Greiff, Wayland, MA (US)

(73) Assignee: Milli Sensors Systems & Actuators, Inc., West Newton, MA (US)

( * ) Notice: Subject to any disclaimer, the term of this patent is extended or adjusted under 35 U.S.C. 154(b) by 529 days.

(21) Appl. No.: 11/113,965

(22) Filed: Apr. 25, 2005

(65) Prior Publication Data

US 2005/0239220 A1    Oct. 27, 2005

Related U.S. Application Data

(60) Provisional application No. 60/565,062, filed on Apr. 23, 2004.

(51) Int. Cl.
*H05K 3/02* (2006.01)
*H05K 3/10* (2006.01)

(52) U.S. Cl. .............. 29/846; 29/602.1; 29/603.16; 29/847; 29/853; 310/12; 310/90.5; 310/266; 310/268; 438/3; 438/48

(58) Field of Classification Search ............ 29/846, 29/602.1, 603.16, 847, 853; 310/90.5, 12, 310/266, 268; 438/3, 48
See application file for complete search history.

(56) References Cited

U.S. PATENT DOCUMENTS

| | | | | |
|---|---|---|---|---|
| 5,481,146 A | * | 1/1996 | Davey | 310/90.5 |
| 5,959,382 A | * | 9/1999 | Dauwalter | 310/90.5 |

* cited by examiner

Primary Examiner—Thiem D. Phan
(74) Attorney, Agent, or Firm—Brian M. Dingman; Mirick, O'Connell, DeMallie & Lougee, LLP

(57) ABSTRACT

Three magnetic substrates are provided, the first substrate forms the rotor and the other two form the outer stator. A series of spaced concentric grooves and spaced spiral grooves are formed in the central region of both faces of the first substrate. A hole is placed at the center of the spiral grooves, and filled with magnetic material. A conductor is then deposited into the spiral grooves, forming a central wheel. A series of spaced serpentine grooves and generally radial grooves are formed on each active face of the other two substrates. A conductor is then deposited into the serpentine grooves, and a magnetic material is deposited into the generally radial grooves. The two outer substrates are then bonded against the first substrate such that the outer end of each magnetic path overlays a filled hole in the first substrate, creating the stator of an axial air gap reluctance motor.

20 Claims, 7 Drawing Sheets

METHOD OF FABRICATING A RATE GYROSCOPE AND ACCELEROMETER MULTISENSOR

CROSS REFERENCE TO RELATED APPLICATION

This application claims priority of Provisional application Ser. No. 60/565,062, filed on Apr. 23, 2004.

FIELD OF THE INVENTION

This invention relates to a rate gyroscope and accelerometer multisensor, and a process for fabricating the device.

BACKGROUND OF THE INVENTION

An instrument capable of being used as a rate gyroscope and accelerometer multisensor is conceptually described in U.S. Pat. No. 5,959,382. The device can be used to measure rotation rate about two orthogonal axes, and accelerations along all three axes. Two such devices thus can be configured as a 6 DOF inertial instrument.

In order to make this multisensor a commercially viable product, it is necessary to use mass production techniques. However, currently used MEMS techniques are adapted for production of micro instruments. The angular momentums that can be developed with the micro vibrating members of Coriolis force gyroscopes limit the performance of inertial instruments made by such techniques.

SUMMARY OF THE INVENTION

It is therefore an object of this invention to develop techniques by which useful angular momentum can be accomplished in a spinning wheel multisensor instrument. This objective is accomplished by fabricating the device by a process termed "millimachining." Millimachining is a fabrication approach developed from a merging of traditional machining technologies and the emerging micromachining technology, applied to devices in the size range between macro and micro. Millimachined gyroscopes can have larger angular momentum and are thus expected to realize higher performance than micro gyroscopes fabricated with the now widespread MEMS technologies. Millimachined devices can also be expected to be less expensive and more reliable than conventionally fabricated macro-sized instruments because they can take advantage of the economy and reproducibility of batch processing and dispense with most of the expensive, time consuming and unreliable hands-on human labor.

This invention features in one embodiment a process for fabricating a rate gyroscope and accelerometer multisensor having an inner magnetically-suspended spinning wheel rotor, with outer stator portions adjacent both faces of the rotor. The high-speed rotation of the wheel, which can be somewhat smaller than a dime, can produce an angular momentum much larger than that of the Coriolis force based MEMS gyroscopes now receiving intensive development, and is expected to provide considerably higher performance than currently available from this class of instrument. Two axes of angular rate information and three axes of acceleration information are provided by the control loops that center the wheel within the case. Thus, two such magnetically suspended spinning wheel devices can be used to implement a complete IMU, and can also provide redundancy in four of the six degrees of freedom.

One inventive process begins with three substrates of magnetic material, each having opposed flat faces, a first substrate being used to form the portion comprising the rotor and the other two being used to form the outer stator portions. A series of spaced concentric grooves are created in the central region of both faces of the first substrate. Outside of the grooves on both faces of the first substrate, a series of spaced spiral grooves are created and then a hole is formed through the thickness of the first substrate proximate the center of the spiral grooves. The holes in the first substrate are filled with magnetic material. A conductor that is insulated from the first substrate is then deposited into the spiral grooves in the faces of the first substrate. A central wheel is created in the first substrate, the wheel carrying the spaced concentric grooves and defining along its edge a series of spaced teeth.

A series of spaced serpentine grooves located around the central region are then formed on one active face of each of the other two substrates, and on the same faces and outside of the serpentine grooves, a series of generally radial grooves are formed. A conductor that is insulated from the substrate is then deposited into the serpentine grooves, and a magnetic material is deposited into the generally radial grooves. The active faces of the two outer substrates are then bonded against the first substrate such that the outer end of each magnetic path overlays a filled hole in the first substrate, to create the stator of an axial air gap reluctance motor.

The spiral grooves are preferably essentially identical. There are preferably four such serpentine grooves on each active face of the other two substrates. The serpentine grooves on each active face are essentially identical. The serpentine grooves preferably each comprise a series of interconnected partially circumferential grooves. The serpentine grooves on each active face preferably each essentially comprise a quadrant of a circle, and are essentially equally spaced from one another. The generally radial grooves are preferably also each essentially identical.

Also featured is a process for fabricating a rate gyroscope and accelerometer multisensor having an inner magnetically-suspended spinning wheel rotor, with outer stator portions adjacent both faces of the rotor, comprising providing three substrates of magnetic material, each having opposed flat faces, a first substrate being used to form the portion comprising the rotor and the other two being used to form the outer stator portions, creating a series of spaced concentric grooves in the central region of both faces of the first substrate, creating outside of the grooves through the thickness of the first substrate a plurality of spaced series of radially-spaced holes, filling the radially-spaced holes with a conductor, creating a central wheel in the first substrate, the wheel carrying the spaced concentric grooves and defining along its edge a series of spaced teeth, creating in the first substrate a series of generally "U"-shaped magnetic members that are spaced from and proximate the spaced teeth, creating on one active face of each of the other two substrates a series of spaced serpentine grooves located around the central region, creating outside of the grooves on each active face a plurality of spaced series of closely-spaced short essentially radial grooves, creating a conductor in the serpentine grooves and in the essentially radial grooves, the conductors insulated from the substrate, and bonding the active faces of the two outer substrates against the first substrate such that at least some of the essentially radial grooves overlay at their ends a hole in the first substrate, to create a radial air gap reluctance motor.

Also featured in the invention is a process for fabricating a rate gyroscope and accelerometer multisensor having an inner magnetically-suspended spinning wheel rotor, with outer stator portions adjacent both faces of the rotor, comprising providing three substrates, each having opposed flat faces, a first substrate being used to form the portion comprising the rotor and the portion comprising part of the spin motor, and the other two being used to form the outer stator portions, creating a series of spaced concentric grooves in the central region of both faces of the first substrate, creating outside of the grooves on both faces of the first substrate a series of spaced spiral grooves, and creating a hole through the thickness of the first substrate proximate the center of the spiral grooves, creating a central wheel in the first substrate, the wheel carrying the spaced concentric grooves and defining along its edge a series of spaced teeth, coating the first substrate and the holes proximate the center of the spiral grooves with a magnetic material, coating the magnetic material with an insulating layer, creating in the spiral grooves in the faces of the first substrate a conductor that is insulated from the first substrate, creating on one active face of each of the other two substrates a series of spaced serpentine grooves located around the central region, creating on the same face of each of the other two substrates and connected to the serpentine grooves a series of generally radial grooves, coating the active faces of the other two substrates with a magnetic material, coating the magnetic material on the active faces of the other two substrates with an insulating layer, creating in the serpentine and generally radial grooves a conductor that is insulated from the substrate, and bonding the active faces of the two outer substrates against the first substrate such that the outer end of each magnetic path overlays a hole in the first substrate proximate the center of a spiral groove, to create the stator of an axial air gap reluctance motor.

In these embodiments, there are preferably four serpentine grooves on each active face of the other two substrates. The serpentine grooves on each active face are preferably essentially identical. The serpentine grooves preferably each comprise a series of interconnected partially circumferential grooves. The serpentine grooves on each active face each preferably essentially comprise a quadrant of a circle, and are essentially equally spaced from one another. The generally radial grooves are also preferably each essentially identical.

BRIEF DESCRIPTION OF THE DRAWINGS

Other objects, features and advantages will occur to those skilled in the art from the following description of the preferred embodiment, and the accompanying drawings, in which.

DETAILED DESCRIPTION OF THE PREFERRED EMBODIMENTS

Figure 1:
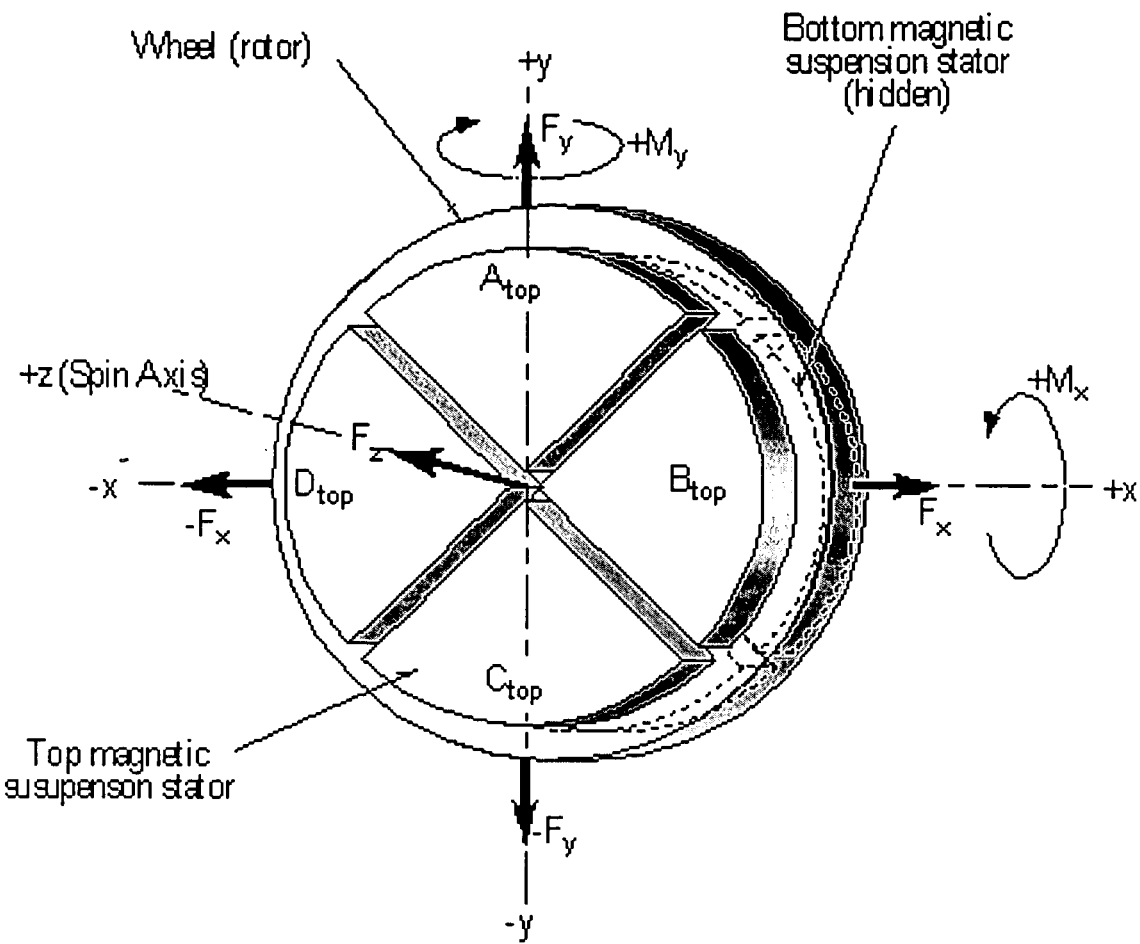
FIG. 1 is a conceptual diagram of a rate gyroscope and accelerometer multisensor according to the invention.

The conceptual design of the preferred embodiment of the invention is disclosed in U.S. Pat. No. 5,959,382, the entire disclosure of which is incorporated herein by reference. The design is schematically depicted in FIG. 1. The control logic for the design is summarized in Table 1.

TABLE 1

MAGNETIC SUSPENSION CONTROL LOGIC

| Sector | $+F_x$ | $-F_x$ | $+F_y$ | $-F_y$ | $+F_z$ | $-F_z$ | $+M_x$ | $-M$ | $+M_y$ | $-M_y$ |
|---|---|---|---|---|---|---|---|---|---|---|
| $A_{top}$ | | | $+\Delta i$ | $-\Delta i$ | $+\Delta i$ | $-\Delta i$ | $+\Delta i$ | $-\Delta i$ | | |
| $B_{top}$ | $+\Delta i$ | $-\Delta i$ | | | $+\Delta i$ | $-\Delta i$ | | | $-\Delta i$ | $+\Delta i$ |
| $C_{top}$ | | | $-\Delta i$ | $+\Delta i$ | $+\Delta i$ | $-\Delta i$ | $-\Delta i$ | $+\Delta i$ | | |
| $D_{top}$ | $-\Delta i$ | $+\Delta i$ | | | $+\Delta i$ | $-\Delta i$ | | | $+\Delta i$ | $-\Delta i$ |
| $A_{bottom}$ | | | $+\Delta i$ | $-\Delta i$ | $-\Delta i$ | $+\Delta i$ | $-\Delta i$ | $+\Delta i$ | | |
| $B_{bottom}$ | $+\Delta i$ | $-\Delta i$ | | | $-\Delta i$ | $+\Delta i$ | | | $+\Delta i$ | $-\Delta I$ |
| $C_{bottom}$ | | | $-\Delta i$ | $+\Delta i$ | $-\Delta i$ | $+\Delta i$ | $+\Delta i$ | $-\Delta i$ | | |
| $D_{bottom}$ | $-\Delta i$ | $+\Delta i$ | | | $-\Delta i$ | $+\Delta i$ | | | $-\Delta i$ | $+\Delta i$ |

The design herein encompasses two different variable reluctance motor designs. The two designs of spin motors for the magnetically suspended spinning wheel gyroscope are termed: axial air gap (FIG. 2A) and radial air gap (FIG. 2B). Of the two, the axial air gap design lends itself well to the same fabrication approach that can be used to form the magnetic suspension components.

Figure 2A:
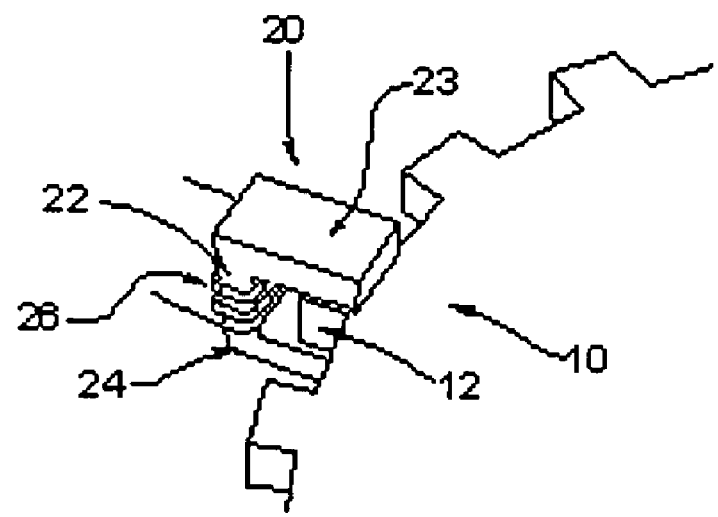
FIGS. 2A and 2B are schematic diagrams of axial air gap and radial air gap reluctance rotor drive designs, respectively, for the invention.
Figure 2B:
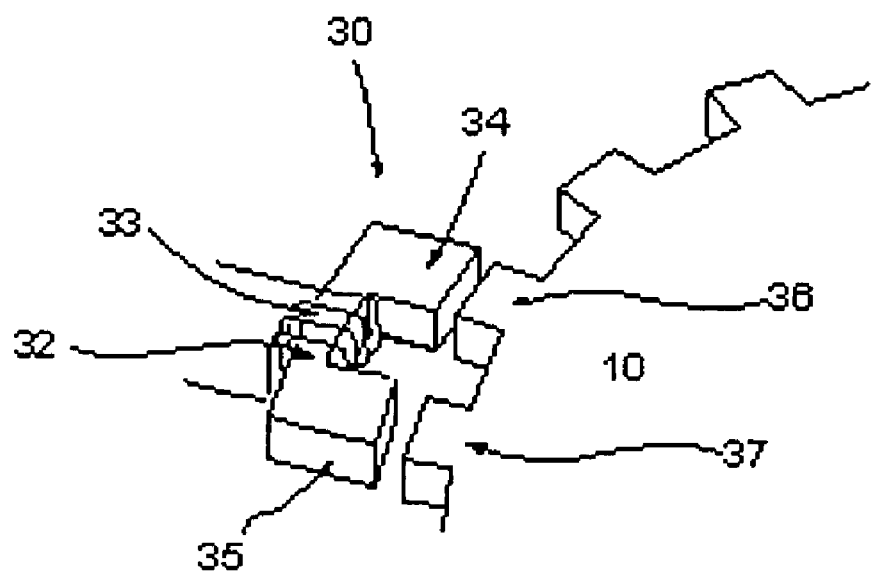

Axial air gap design 20, FIG. 2A, comprises coil 26 formed around center post 22 that creates a flux path along with horizontal legs 23 and 24. The distal ends of legs 23 and 24 lie over tooth 12 of rotor 10. Radial air gap design 30, FIG. 2B, comprises coil 32 formed around center member 33 that creates a flux path along with horizontal legs 34 and 35. The distal ends of legs 34 and 35 lie proximate teeth 36 and 37 rotor 10.

The axial air gap design has the advantage that the excitation conductors (coils) can be formed in the plane of the substrate from which the rotor is formed. For the radial air gap design, the coil requires vertical vias through the substrate to connect the in-plane conductors on both sides, to form a continuous coil. This complicates the processing somewhat. The axial air gap design is preferable because it provides greater torque per applied current, thereby reducing power dissipation; it should therefore be able to drive the wheel to higher speeds, generating high angular momentum for improved gyroscope performance. However, the axial forces generated by the motor are generally larger for the axial air gap configuration. The trade-off between torque capability and errors introduced in the gyroscope operation is an important consideration in selecting which motor configuration to use.

Gyroscope Operation

When the gyroscope experiences, for example, a rotation, $\theta_y$, about the y-axis of FIG. 1, the gyroscope wheel remains fixed in inertial space, with a resulting angular displacement $\theta_y$, between the gyroscope wheel and the magnetic suspension stator quadrants. The gyroscope wheel position pickoff system then generates an electrical signal proportional to that angular displacement; this signal is then processed and fed back to the appropriate magnetic suspension quadrants so as to return the wheel to its original centered position relative to the stators. In the situation described, a feedback torque, $M_y$, is required to rotate the wheel by an amount $-\theta_y$ relative to the magnetic suspension stator quadrants to return it to the centered position. The magnetic suspension stator current changes required to accomplish this are indicated in Table 1 in the column headed "$-M_y$". This mode of gyroscope operation is commonly termed "strapdown", and the changes in magnetic suspension stator quadrant currents are linearly proportional to the angular rates about the input axes (Although the forces developed by an individual actuator quadrant are proportional to the square of the actuator current, when operated with a quiescent current in all quadrants, as described above, the net force or torque on the wheel is a linear function of the change of the control current, $\Delta i$.). The gyroscope described here is therefore termed a "rate gyroscope".

Accelerometer Operation

When the gyroscope experiences linear acceleration along, for example, the +x-axis, the gyroscope wheel remains stationary in inertial space and the wheel experiences a linear displacement along the −x-axis, relative to the magnetic suspension stators, which is proportional to the time integral of the x-axis acceleration. The gyroscope wheel position pickoff system then generates an electrical signal proportional to that displacement which is processed and fed back to the appropriate magnetic suspension stators to generate a force, $+F_x$, to return the wheel to its centered position relative to the magnetic suspension stators. The required magnetic suspension stator current changes required to accomplish this are indicated in the column headed "$+F_x$" of Table 1. The magnetic suspension stator quadrant current changes are then proportional to the acceleration along the x-axis (although the forces developed by an individual actuator quadrant are proportional to the square of the actuator current, when operated with a quiescent current in all quadrants, as described above, the net force or torque on the wheel is a linear function of the change of the control current, $\Delta i$.) and vice-versa.

Multisensor

Since the magnetically suspended gyroscope described above can simultaneously sense angular rates about two orthogonal axes and linear acceleration along 3 orthogonal axes, it may be considered to be a multi-sensor. Two such multi-sensors, when properly oriented relative to each other, can constitute a system for measuring motion in all 6 degrees of freedom, 3 axes of angular rate and 3 axes of linear acceleration.

Fabrication Approaches

The Magnetically Suspended Spinning Wheel Gyroscope is designed to facilitate high volume manufacturing using well-established MEMS fabrication approaches. To facilitate this, the gyroscope is designed for fabrication in a number of layers, which are than joined to form the completed instrument. The concept permits each layer of the gyroscope to be fabricated using the same processes. A gyroscope with an axial gap motor is used to explain the concept and processes to be used. The outer layers are mirror images; the design of only two different layers is required.

Two approaches are described for the construction and fabrication of the subject gyroscope.

1. The magnetic parts of the gyroscope (rotor, magnetic suspension stators and spin motor stators) are made from layers of conventional magnetic materials, such as Permalloy. The desired parts are formed by removing the unwanted material, leaving parts of the desired configuration. The unwanted material can be removed by conventional machining processes or by several of the well-known MEMS processes, such as Deep Reactive Ion Etching (DRIE) or various well-known methods of electrochemical etching. Then, insulators, electrical conductors and additional magnetic materials are deposited to complete the required functional elements.

2. The magnetic parts of the gyro (rotor, magnetic suspension stators and spin motor stators) are made from silicon wafers, which are subsequently coated with layers of conventional magnetic materials, such as Permalloy. These layers can be deposited by any of a number of well-known coating processes, such as sputtering and electroplating. Subsequently, a number of layers of insulating materials (such as Parylene or various inorganic materials, such as aluminum oxide), electrical conductors, such as gold or copper, and magnetic materials are deposited to complete the required functional elements.

Fabrication Utilizing Solid Magnetic Materials

Figure 3:
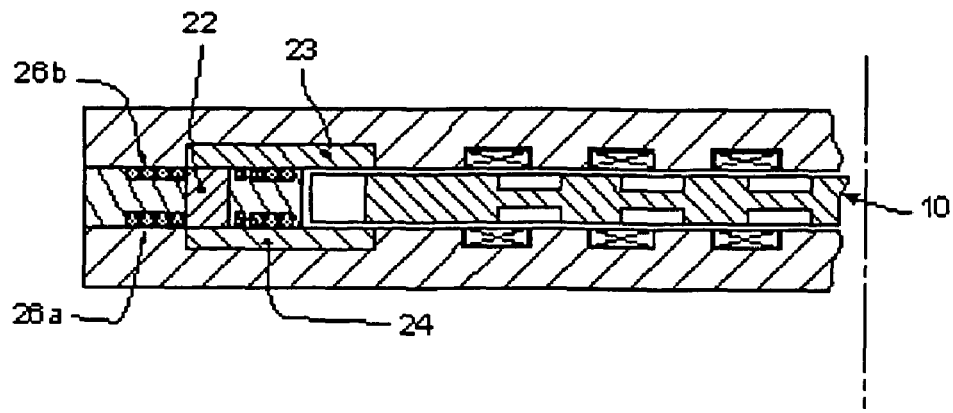
FIG. 3 is a schematic cross-sectional diagram of a portion of an axial air gap design of the inventive multisensor.

The general process consists of etching grooves in a properly exposed photo-resist and then back-filling the grooves with either magnetic material or electrical conductors to form the magnetic elements of the motor and the coils for motor excitation. The formation of the axial air gap motor stator requires that a vertical via be formed in the resist and back-filled with magnetic material to form a post through the resist. This detail is shown in FIG. 3, which shows a cross-section of the assembly of the three layers. Two coils 26a and 26b (one on each side of the layer) are connected in series for each motor stator segment to provide the excitation for the motor stator. Horizontal magnetic core segments 23, 24 are formed in the outer layers and extend over the teeth on the periphery of wheel 10. Vertical magnetic posts 22 connect the two horizontal core segments to form each motor stator U-core.

Middle Layer Fabrication

Figure 4:
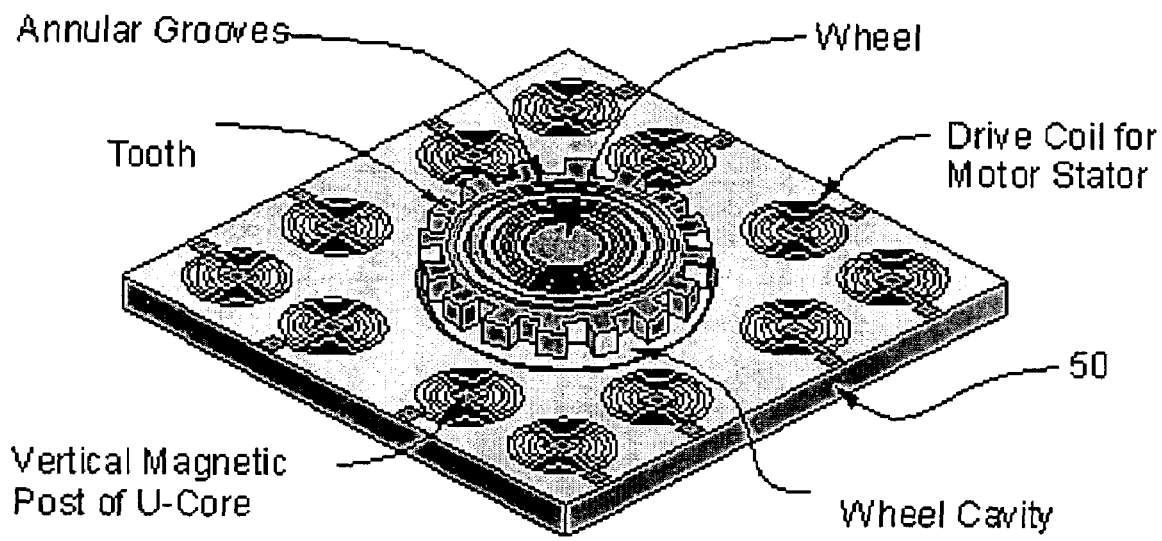
FIG. 4 is a schematic view of the preferred embodiment of one side of the central layer containing the rotor.

The middle layer 50 is shown in FIG. 4, which shows the wheel elevated above the layer for clarity. The middle layer contains the same features on both sides, namely:

Drive coils (spiral conductive features) for the motor stator

Vertical magnetic posts for the motor stator

Wheel

The Fabrication Process Steps are:

1. etch concentric grooves on one side of the layer to form annular grooves in what will become the wheel, etch spiral grooves for the deposition of motor stator copper coils, and etch partial through-holes (vias) for the vertical magnetic posts of the motor stator core.

2. deposit copper into spiral grooves to form the coils for motor excitation.

3. deposit magnetic material into vertical vias to form magnetic posts.

Figure 5:
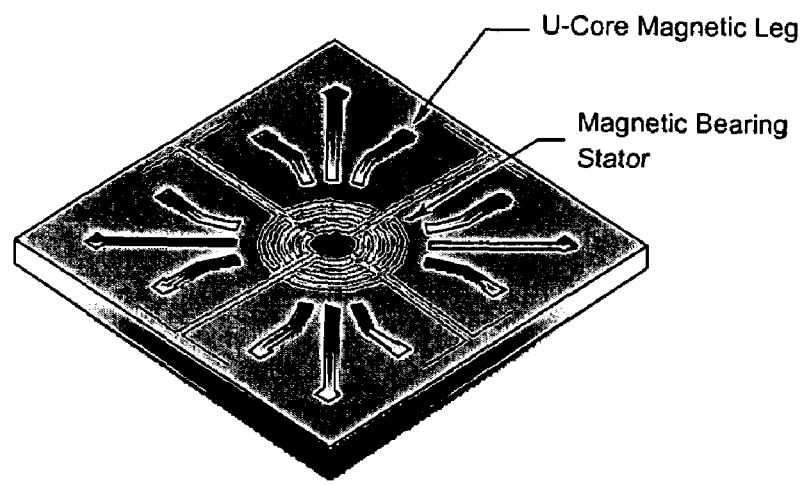
FIG. 5 is a schematic view of the preferred embodiment of one side of the outer stator layers.

4. Invert the layer and repeat the first three steps
5. Etch completely through the layer to form vias for vertical magnetic posts, to form wheel teeth and wheel cavity (in the case of the vertical magnetic layer, the etch will proceed until it reaches the partial fill from the first side)
6. deposit magnetic material into vias to form the balance of the vertical magnetic posts Outer Layer Fabrication The outer layer 60 is shown in FIG. 5. It contains features on one side only. The features are:
  Coils 64 for the magnetic bearing stator
  Horizontal core segments 66 for the U-core (magnetic core leg)

Figure 6:
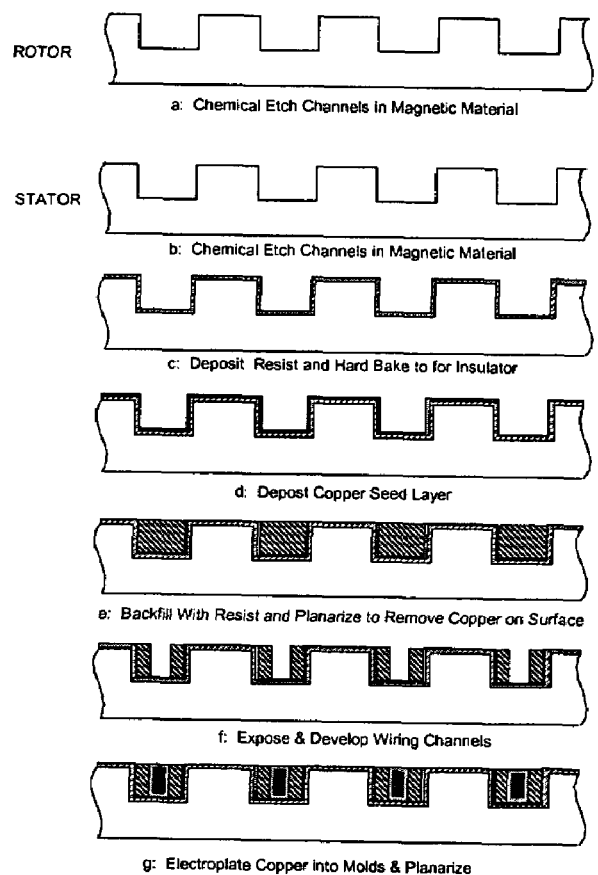
FIG. 6 is a schematic diagram illustrating the steps to accomplish one preferred embodiment of the method of this invention.

The Basic Fabrication Process Consists of the Following Steps:
  1. etch on one side of the layer to form grooves for the deposition of bearing stator copper coils and horizontal core segments for the motor U-core.
  2. deposit copper into grooves to form stator coils for the magnetic bearing
  3. deposit magnetic material into grooves to form horizontal motor stator core segments Process Description Fabrication makes use of existing MEMS and macro planar technologies. The selected processes for the fabrication of the rotor and stator are illustrated in FIG. 6.

The starting material is a suitable high permeability magnetic material. The steps for the magnetic bearing are described are but they also apply to the formation of coils and motor stator magnetics, with the exception of cutting through the middle layer. The sequence of the process steps is:
  a) Chemical etching is used to form the channels in the rotor substrate. A mask is required.
  b) Chemical etching is used to form channels in the stator substrates. A mask is required.
  c) A photoresist is deposited over all surfaces and hard baked to form an electrical insulator.
  d) A seed layer of copper is sputter deposited over all surfaces.
  e) Cover the surface with SU-8 resist to fill the channels. Planarize the surface to the level of the magnetic substrate.
  f) Expose and develop the SU-8 to form wiring channels. The copper seed is exposed in the process. SU-8 is selected because it forms good sidewalls, is an electrical insulator and is a good structural material. A photolithographic mask is required for the pattern.
  g) Electrically connect to the copper seed layer and plate to fill the wiring channels to the surface. Planarize.

Fabrication Utilizing Silicon Coated with Soft Magnetic Materials.

Figure 7A:
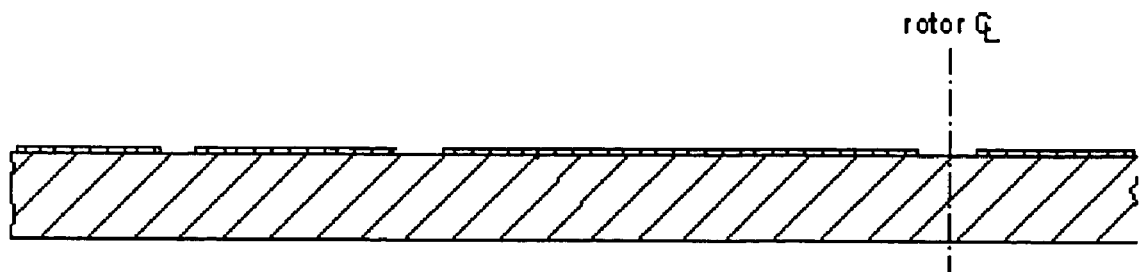
FIGS. 7A-7O are schematic diagrams illustrating the steps to accomplish one preferred embodiment of the method of this invention.
Figure 7B:
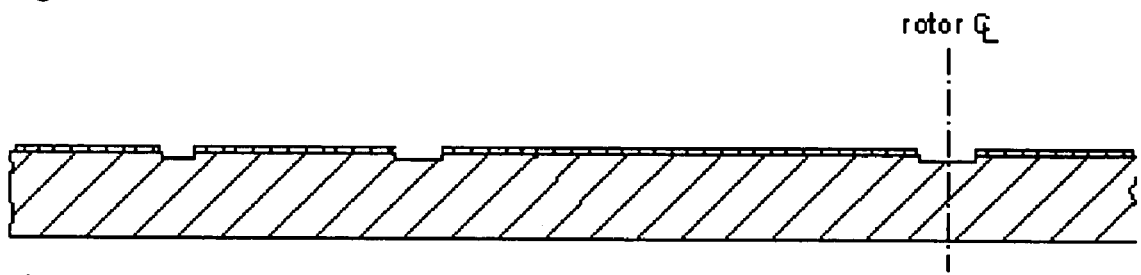
Figure 7C:
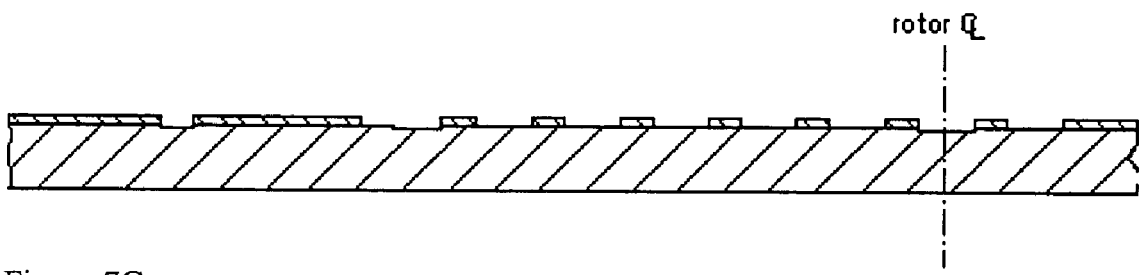
Figure 7D:
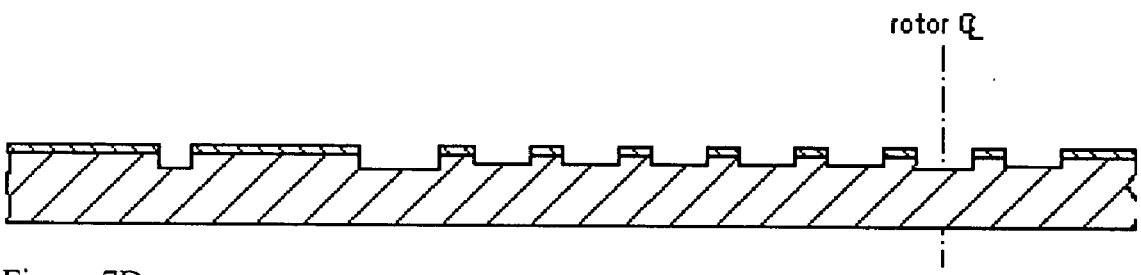
Figure 7E:
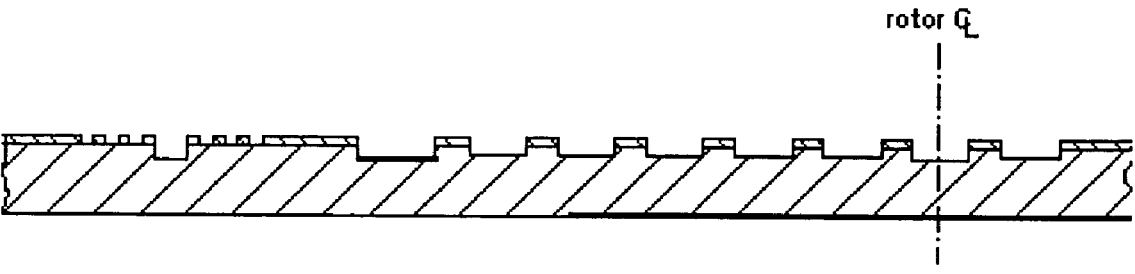
Figure 7F:
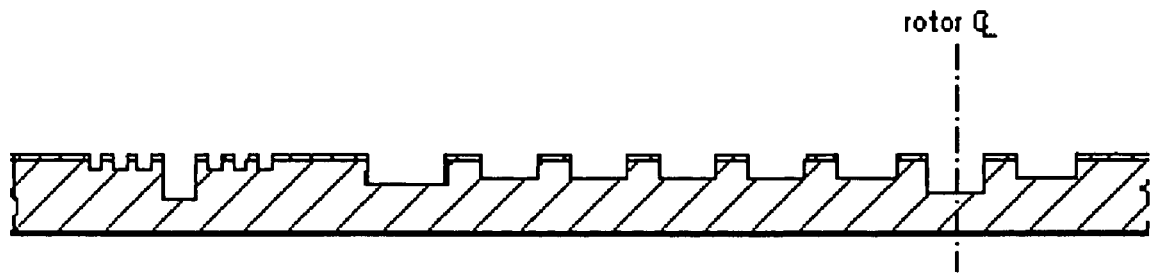
Figure 7G:
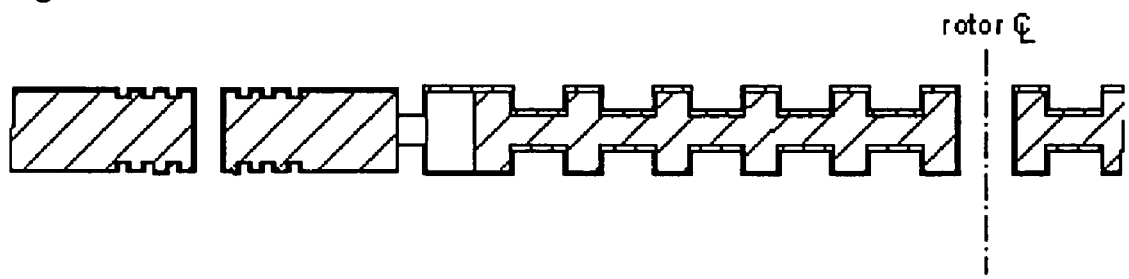
Figure 7H:
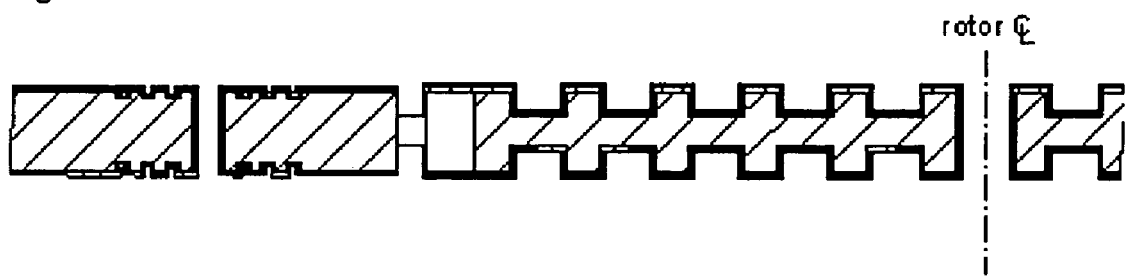
Figure 7I:
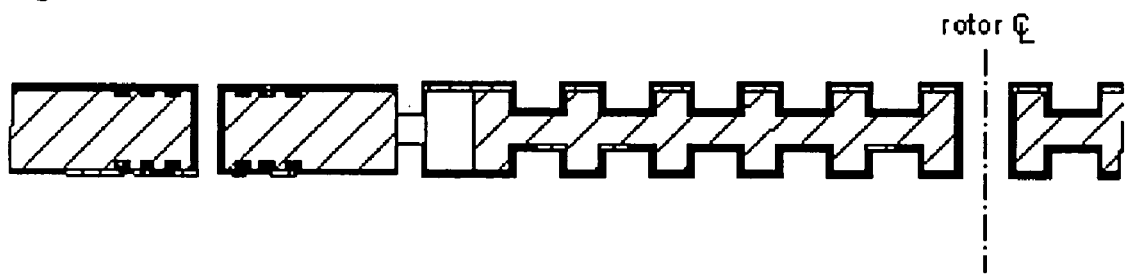
Figure 7J:
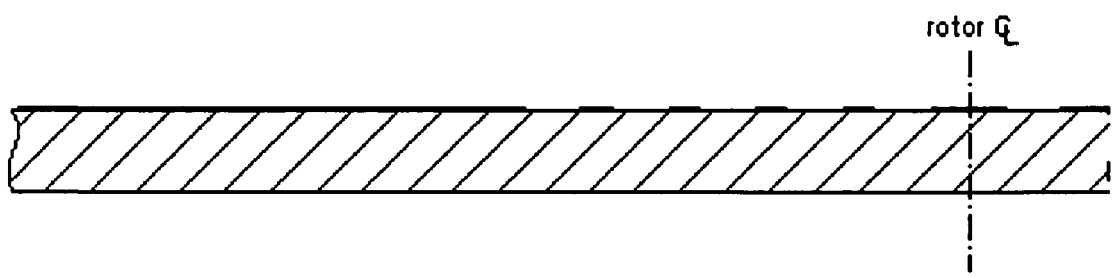
Figure 7K:
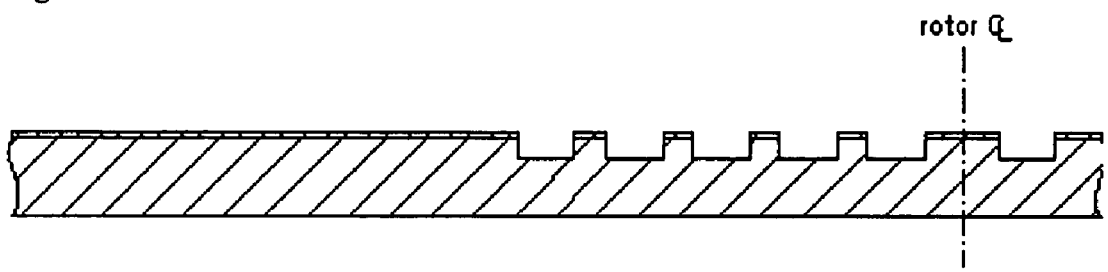
Figure 7L:
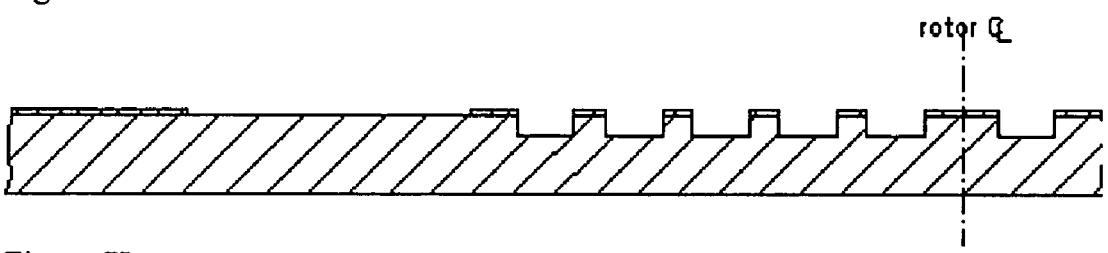
Figure 7M:
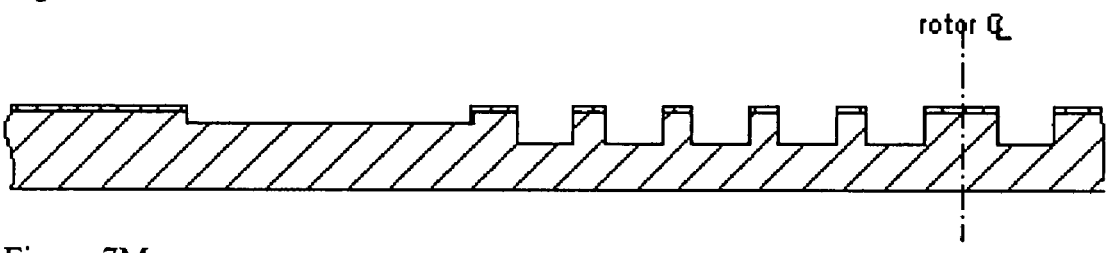
Figure 7N:
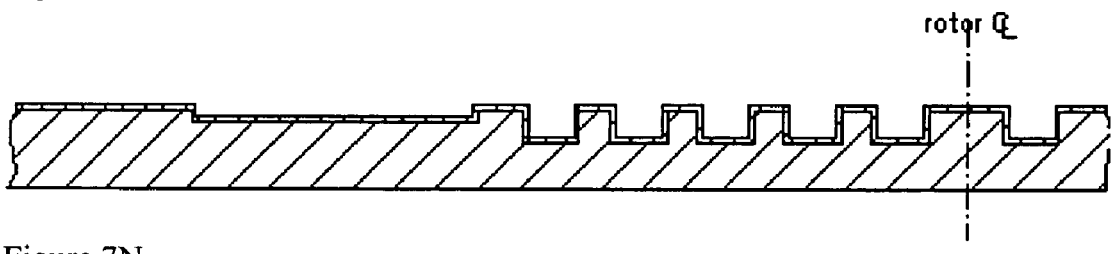
Figure 7O:
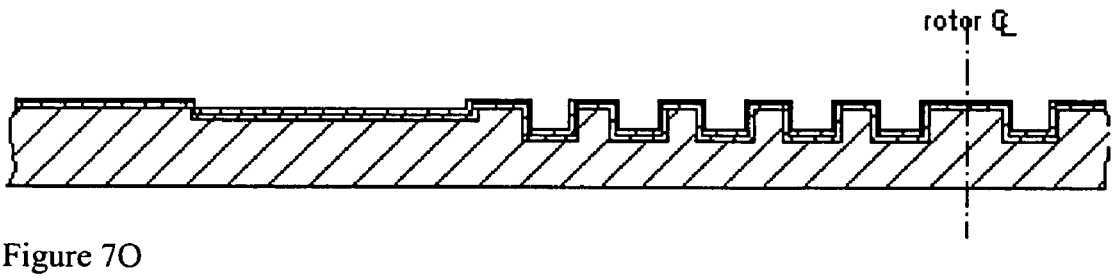

The general process consists of etching grooves in a silicon wafer using properly exposed photo-resist and then coating the entire wafer (each wafer may contain many, usually identical, rotor or stator elements) with a suitable soft magnetic material and then applying layers of insulation, and then photo-resist, which is patterned and developed, following which conductors are deposited. The detail of the result is shown in FIGS. 7A-7O (similar to FIG. 3, but with coated Si instead of solid magnetic material), which shows a cross-section of the assembly of the three layers. Two coils 26a and 26b (one on each side of the layer) are connected in series for each motor stator segment to provide the excitation for the motor stator. Horizontal magnetic core segments 23, 24 are formed in the outer layers and extend over the teeth on the periphery of wheel 10. Vertical magnetic posts 22 connect the two horizontal core segments to form each motor stator U-core.

Middle Layer Fabrication

The middle layer 50 is shown in FIG. 4, which shows the wheel elevated above the layer for clarity. The middle layer contains the same features on both sides, namely:
  Drive coils (spiral conductive features) for the motor stator
  Vertical magnetic posts for the motor stator
  Wheel The Fabrication Process Steps are:
  1. Photo resist is applied on one side of the wafer, patterned to expose the vias and the central hole in the rotor, and then developed to remove the unwanted photo resist. This is shown in FIG. 7A
  2. The exposed silicon is etched using DRIE as shown in FIG. 7B
  3. Photo resist is applied, patterned and developed as in step 1, except that pattern additionally exposes the areas that will become the tang which attaches the completed rotor to the wafer. This is shown in FIG. 7C.
  4. The exposed silicon is etched using DRIE as shown in FIG. 7D.
  5. Photo resist is applied, patterned and developed as in step 3, except that the pattern additionally exposes the areas that will become the spiral grooves that will later be filled with electrical conductors. This is shown in FIG. 7E.
  6. The exposed silicon is etched using DRIE as shown in FIG. 7F. In this step, the silicon in the areas of the central hole, the vias and the rotor slots is etched slightly beyond the center of the wafer.
  7. The wafer is turned over and steps 1 through 6 are performed. After this step, there is no silicon in the vias, central hole and slot areas of the rotor.
  8. The entire wafer is coated all over to the desired thickness with a suitable soft magnetic material, such as permalloy, as shown in FIG. 7G.
  9. The wafer is coated all over with a suitable thin coat of insulation, such as Parylene as shown in FIG. 7H.
  10. A seed layer is deposited in the spiral grooves and a suitable electrical conductor is electrodeposited in the spiral grooves, forming the excitation coils of the axial air gap motor, as shown in FIG. 7I.
  11. The wafer is planarized to remove the excess copper and insulation over the silicon surface, as shown in FIG. 7I. At this point, the middle wafer is ready for bonding with the two outer layers.

Outer Layer Fabrication

The outer layer 60 is shown in FIG. 5. It contains features on one side only. The features are:
  Coils 64 for the magnetic bearing stator
  Horizontal core segments 66 for the U-core (magnetic core leg)

The basic fabrication process is very similar to that of the middle layer, except that there are no through holes and the copper conductors are deposited in the magnetic suspension stator slots instead of the spiral grooves provided in the middle layer for the motor excitation coils. In addition, a thin layer of metallization is deposited on insulation over the magnetic suspension stators and patterned to form the stationary portions of the gyro wheel displacement sensing capacitors. The process consists of the following steps:

1. Photo resist is applied on one side of the wafer, patterned to expose the areas of the spin motor U-core Magnetic legs (66 on FIG. 5), and then developed to remove the unwanted photo resist. This is shown in FIG. 7J.
2. The exposed silicon is etched using DRIE as shown in FIG. 7K.
3. Photo resist is applied on one side of the wafer, patterned to expose the areas of the spin motor U-core Magnetic legs (66 on FIG. 5) and the grooves for the magnetic suspension stator conductors, and then developed to remove the unwanted photo resist. This is shown in FIG. 7L.
4. The exposed silicon is etched using DRIE, as shown in FIG. 7M.
5. The wafer is coated with a layer of soft magnetic material, such as Permalloy, as shown in FIG. 7N.
6. The wafer is coated with a thin layer of insulation, such as Parylene, as shown in FIG. 7O.
7. A seed layer is deposited on the surface, which is then planarized.
8. Copper is electroplated to fill the grooves above the level of the surface.
9. The wafer is planarized.
10. The wafer is coated with a thin layer of insulation, such as Parylene.
11. Photo resist is applied to the wafer and patterned for the wheel position sensor stator capacitors.
12. A thin layer of metallization is deposited to form the wheel position sensor stator capacitors.
13. The wafer is coated with a thin layer of insulation, such as Parylene.

The middle layer wafer is then placed between the outer layers, aligned and bonded. The wheel is then freed from the assembly by laser cutting, through the holes provided in the outer layers for that purpose, the tabs attaching it to the middle layer and the gyro is ready for operation.

Although specific features of the invention are shown in some drawings and not others, this is for convenience only as the various features may be combined in accordance with the invention.

Other embodiments will occur to those skilled in the art and are within the scope of the following claims.

What is claimed is:

1. A process for fabricating a rate gyroscope and accelerometer multisensor having an inner magnetically-suspended spinning wheel rotor, with outer stator portions adjacent both faces of the rotor, comprising:
    a. providing three substrates of magnetic material, each having opposed flat faces, a first substrate being used to form the portion comprising the rotor and the other two being used to form the outer stator portions;
    b. creating a series of spaced concentric grooves in the central region of both faces of the first substrate;
    c. creating outside of the grooves on both faces of the first substrate a series of spaced spiral grooves;
    d. creating a hole through the thickness of the first substrate proximate the center of the spiral grooves;
    e. filling the holes in the first substrate with magnetic material;
    f. creating in the spiral grooves in the faces of the first substrate a conductor that is insulated from the first substrate;
    g. creating a central wheel in the first substrate, the wheel carrying the spaced concentric grooves and defining along its edge a series of spaced teeth;
    h. creating on one active face of each of the other two substrates a series of spaced serpentine grooves located around the central region;
    i. creating on the same face of each of the other two substrates and outside of the serpentine grooves a series of generally radial grooves;
    j. creating in the serpentine grooves a conductor that is insulated from the substrate;
    k. creating in the generally radial grooves a magnetic path that is insulated from the substrate; and
    l. bonding the active faces of the two outer substrates against the first substrate such that the outer end of each magnetic path overlays said hole in the first substrate proximate the center of a spiral groove, to create the stator of an axial air gap reluctance motor.

2. The process of claim 1, wherein the spiral grooves are essentially identical.

3. The process of claim 1, wherein there are four serpentine grooves on each active face of the other two substrates.

4. The process of claim 3, wherein the serpentine grooves on each active face are essentially identical.

5. The process of claim 4, wherein the serpentine grooves each comprise a series of interconnected partially circumferential grooves.

6. The process of claim 5, wherein the serpentine grooves on each active face each essentially comprise a quadrant of a circle, and are essentially equally spaced from one another.

7. The process of claim 1, wherein the generally radial grooves are each essentially identical.

8. A process for fabricating a rate gyroscope and accelerometer multisensor having an inner magnetically-suspended spinning wheel rotor, with outer stator portions adjacent both faces of the rotor, comprising:
    a. providing three substrates of magnetic material, each having opposed flat faces, a first substrate being used to form the portion comprising the rotor and the other two being used to form the outer stator portions;
    b. creating a series of spaced concentric grooves in the central region of both faces of the first substrate;
    c. creating outside of the grooves through the thickness of the first substrate a plurality of spaced series of radially-spaced holes;
    d. filling the radially-spaced holes with a conductor;
    e. creating a central wheel in the first substrate, the wheel carrying the spaced concentric grooves and defining along its edge a series of spaced teeth;
    f. creating in the first substrate a series of generally "U"-shaped magnetic members that are spaced from and proximate the spaced teeth;
    g. creating on one active face of each of the other two substrates a series of spaced serpentine grooves located around the central region;
    h. creating outside of the grooves on each active face a plurality of spaced series of closely-spaced short essentially radial grooves;
    i. creating a conductor in the serpentine grooves and in the essentially radial grooves, the conductors insulated from the substrate; and
    j. bonding the active faces of the two outer substrates against the first substrate such that at least some of the essentially radial grooves overlay at their ends a hole in the first substrate proximate the center of a spiral groove, to create a radial air gap reluctance motor.

9. The process of claim 8, wherein there are four serpentine grooves on each active face of the other two substrates.

10. The process of claim 9, wherein the serpentine grooves on each active face are essentially identical.

11. The process of claim 10, wherein the serpentine grooves each comprise a series of interconnected partially circumferential grooves.

12. The process of claim 11, wherein the serpentine grooves on each active face each essentially comprise a quadrant of a circle, and are essentially equally spaced from one another.

13. The process of claim 8, wherein the generally radial grooves are each essentially identical.

14. A process for fabricating a rate gyroscope and accelerometer multisensor having an inner magnetically-suspended spinning wheel rotor, with outer stator portions adjacent both faces of the rotor, comprising:
   a. providing three substrates, each having opposed flat faces, a first substrate being used to form the portion comprising the rotor and a portion of the spin motor stator, and the other two being used to form the outer stator portions;
   b. creating a series of spaced concentric grooves in the central region of both faces of the first substrate, creating outside of the grooves on both faces of the first substrate a series of spaced spiral grooves, and creating a hole through the thickness of the first substrate proximate the center of the spiral grooves;
   c. creating a central wheel in the first substrate, the wheel carrying the spaced concentric grooves and defining along its edge a series of spaced teeth;
   d. coating the first substrate, including the holes proximate the center of the spiral grooves, with a magnetic material;
   e. coating the magnetic material with an insulating layer;
   f. creating in the spiral grooves in the faces of the first substrate a conductor that is insulated from the first substrate;
   g. creating on one active face of each of the other two substrates a series of spaced serpentine grooves located around the central region;
   h. creating on the same face of each of the other two substrates and connected to the serpentine grooves a series of generally radial grooves;
   i. coating the active faces of the other two substrates with a magnetic material;
   j. coating the magnetic material on the active faces of the other two substrates with an insulating layer;
   k. creating in the serpentine and generally radial grooves a conductor that is insulated from the substrate; and
   l. bonding the active faces of the two outer substrates against the first substrate such that the outer end of each magnetic path overlays said hole in the first substrate proximate the center of a spiral groove, to create the stator of an axial air gap reluctance motor.

15. The process of claim 14, wherein the spiral grooves are essentially identical.

16. The process of claim 14, wherein there are four serpentine grooves on each active face of the other two substrates.

17. The process of claim 16, wherein the serpentine grooves on each active face are essentially identical.

18. The process of claim 17, wherein the serpentine grooves each comprise a series of interconnected partially circumferential grooves.

19. The process of claim 18, wherein the serpentine grooves on each active face each essentially comprise a quadrant of a circle, and are essentially equally spaced from one another.

20. The process of claim 1, wherein the generally radial grooves are each essentially identical.

* * * * *